(12) United States Patent
Yamamoto et al.

(10) Patent No.: US 7,416,344 B2
(45) Date of Patent: Aug. 26, 2008

(54) PUMP CARRYING SUPERCRITICAL FLUID WITH CERAMIC BEARINGS

(75) Inventors: Yasuharu Yamamoto, Takasago (JP);
Toshiyuki Osada, Takasago (JP);
Takafumi Yoshida, Nagasaki (JP);
Takaaki Kaikogi, Takasago (JP);
Masaharu Minami, Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 246 days.

(21) Appl. No.: 10/554,388

(22) PCT Filed: Jul. 21, 2004

(86) PCT No.: PCT/JP2004/010337

§ 371 (c)(1),
(2), (4) Date: Oct. 25, 2005

(87) PCT Pub. No.: WO2005/012731

PCT Pub. Date: Feb. 10, 2005

(65) Prior Publication Data

US 2006/0239845 A1    Oct. 26, 2006

(30) Foreign Application Priority Data

Jul. 30, 2003    (JP)    ............................. 2003-203539

(51) Int. Cl.
*F16C 33/32*    (2006.01)
*F04B 17/03*    (2006.01)

(52) U.S. Cl. .................... 384/492; 417/423.12

(58) Field of Classification Search ................ 384/492, 384/907.1, 516; 417/423.12

See application file for complete search history.

(56) References Cited

U.S. PATENT DOCUMENTS

| 5,102,239 | A | 4/1992 | Momose et al. |
| 6,264,448 | B1 | 7/2001 | Itoh et al. |
| 6,530,695 | B2* | 3/2003 | Kawamura et al. .......... 384/492 |
| 6,558,139 | B2 | 5/2003 | Nguyen et al. |
| 6,710,487 | B2* | 3/2004 | Brown .................... 384/492 |
| 6,759,774 | B1* | 7/2004 | Griggs .................... 310/87 |
| 2002/0168125 | A1* | 11/2002 | Kahlman et al. .......... 384/492 |
| 2003/0063825 | A1 | 4/2003 | Ooitsu et al. |
| 2003/0077015 | A1 | 4/2003 | Sugimori et al. |

FOREIGN PATENT DOCUMENTS

| JP | 01-315692 A | 12/1989 |
| JP | 6-8777 U | 2/1994 |

(Continued)

*Primary Examiner*—Thomas R Hannon
(74) *Attorney, Agent, or Firm*—Birch, Stewart, Kolasch & Birch, LLP (57) ABSTRACT

A pump for carrying supercritical $CO_2$ fluid or liquid $CO_2$ capable of securing reliability by optimizing a bearing part. An angular ball bearing (8) comprises an inner ring (8a), an outer ring (8b), balls (8c) held therebetween, and a cage (8d) holding the balls (8c). Both the balls and the inner and outer rings are formed of a ceramic to form a totally ceramic bearing. Also, the cage (8d) is guided by the outer ring or the inner ring. Specifically, for example, when the cage is guided by the inner ring, the inner peripheral surface (8db) of the cage (8d) opposed to the outermost peripheral surface (8ab) of the inner ring (8a) is guided by the outermost peripheral surface (8ab) of the inner ring (8a).

20 Claims, 7 Drawing Sheets

FOREIGN PATENT DOCUMENTS

| | | |
|---|---|---|
| JP | 6-193598 A | 7/1994 |
| JP | 9-177792 A | 7/1997 |
| JP | 10-274188 A | 10/1998 |
| JP | 11-156311 A | 6/1999 |
| JP | 2000-9077 A | 1/2000 |
| JP | 2000-130441 A | 5/2000 |
| JP | 2000-352377 A | 12/2000 |
| JP | 2002-349582 A | 12/2002 |
| JP | 2002-357266 A | 12/2002 |
| JP | 2002-364658 A | 12/2002 |
| JP | 2003-65341 A | 3/2003 |
| JP | 2003-124177 A | 4/2003 |
| TW | 451038 | 8/2001 |

\* cited by examiner

PUMP CARRYING SUPERCRITICAL FLUID WITH CERAMIC BEARINGS

TECHNICAL FIELD

The present invention relates to a pump which carries supercritical $CO_2$ fluid or liquid $CO_2$.

BACKGROUND ART

Because supercritical fluid can continuously change the volume (density) thereof by regulating the temperature and pressure, values of various properties such as dissolution characteristic and the like can be easily controlled, which makes it possible to utilize supercritical fluid as a refrigerant. Additionally, because the viscosity thereof is low but the diffusivity thereof is high, supercritical fluid is expected to be used for washing; or is expected to be used as a refrigerant because the thermal conductivity thereof is high.

Being easy to get and good in handling and the like because of not having explosive nature, inflammability and the like, water, $CO_2$ and the like are generally used as supercritical fluid. Especially, $CO_2$ has characteristics that the critical temperature is 31° C. and the critical pressure is 7.38 Mpa; that the temperature and the pressure are low but manageability is superior, being compared with other materials; that $CO_2$ is a gaseous body at the atmospheric pressure and the ambient temperature; and the like. Therefore, $CO_2$ is made wide use of as an extracting solvent for materials which are easily affected by heat (such as foods, flavoring ingredients and the like) and as a cleaning agent and the like which utilize the drying characteristics and permeability thereof. Additionally, $CO_2$ is generally used by being pressurized up to no less than 7 to 20 MPa in an extracting equipment or a cleaning equipment that employs the supercritical $CO_2$.

Because a pump for carrying $CO_2$ in such an equipment as mentioned hereinabove is used at high pressure, so-called sealless canned motor type of pump is adopted. In some cases, ball bearings are employed as the bearings and used in solution (supercritical $CO_2$). However, when the pump is used for the food sector or semi-conductor sector, wear of the bearings cannot be permitted in order to prevent foreign objects (particles) from occurring inside the pump.

As an example of the pump, a turbo-molecular pump is disclosed in Patent Literature 1. In addition, a canned motor type of pump is disclosed in Patent Literature 2. As for the rest, a semi-conductor manufacturing method and a semi-conductor manufacturing equipment are disclosed in Patent Literature 3, which prevent heavy-metal contamination of extra-pure water being manufactured by an extra-pure water manufacturing system for manufacturing of semi-conductors.

Patent Literature 1: Patent Application Laid Open as H10-274188

Patent Literature 2: Patent Application Laid Open as 2000-9077

Patent Literature 3: Patent Application Laid Open as 2003-124177

DISCLOSURE OF THE INVENTION

Issues to be Solved by the Present Invention

Because ball bearings are used in supercritical $CO_2$ (or liquid $CO_2$) of low viscosity, lubrication by liquid being pumped cannot be expected and the environmental condition is severe for the wear of the bearings. Additionally, in a cleaning equipment and the like, in order to enhance the cleaning capability thereof further, there is a case where cleaning chemical is mixed into $CO_2$. Therefore, there is a concern of corrosion and the like of the ball bearings being caused by chemicals.

The above-mentioned ball bearings receive the radial load and thrust load which act on a rotor. Additionally, a pump is constructed in a manner that the preload is supplied by a bearing preload spring which is installed to the bearing on the shaft-end side, being opposite to the bearing on the impeller side which will be described later, so as to prevent so-called revolution skidding (side skidding) of the bearings. However, because the pump being so constructed as described above is used in the liquid being pumped (what is called "in a condition of being thoroughly immersed"), rotational resistance (a loss due to agitation) of balls and a cage is large so that the revolution skidding of bearings is easy to occur. Therefore, there arises a case where it is necessary to apply a large preload in order to prevent the revolution skidding.

On the other hand, in order to secure the life of the bearings, it is desirable to make the bearing load including the preload as small as possible. However, because the bearings are used in the liquid being pumped, the pump must be designed, taking prevention of the revolution skidding into consideration.

It is an object of the prevent invention to provide a pump for carrying supercritical $CO_2$ fluid or liquid $CO_2$ capable of securing reliability by optimizing a bearing part.

Means to Solve the Issue

In order to achieve the above-mentioned object, a pump for carrying supercritical $CO_2$ fluid or $CO_2$ liquid in accordance with the present invention has bearings which axially support the main shaft of a motor driving the pump, wherein inner rings, outer rings and balls (rolling elements) thereof are formed of a ceramic material, respectively.

Additionally, a cage holding the balls is guided by the outer ring, being guided by the inner peripheral surface of the outer ring, or guided by the inner ring, being guided by the outer peripheral surface of the inner ring; wherein the surface being guided by the outer ring or the inner ring is both of the side surfaces or one side surface in the axial direction.

Moreover, the ratio of the slot radius of the inner ring of the bearing is more than 52%, and the main shaft is hollow.

The curvature radius of the orbit slot of the inner ring heretofore known is no less than 52% as specified, for example, by the JIS standards. Especially, in a high-speed rotating range, antifriction bearings that are used in the atmosphere of supercritical $CO_2$ fluid are easy to wear, wherein the wear is presumed to be significantly attributed to skidding caused by spinning. Balls of an angular ball bearing generally roll on the plane of the orbit of either the inner ring or the outer ring almost without skidding, while spinning occurs on the other plane of the orbit.

In addition, in the angular ball bearing, the curvature radius of the orbit slot of the inner ring is smaller than that of the outer ring, and the major axis of the osculating ellipse is long when a load is applied. As a result, in the inner ring, spinning motion of the balls is disturbed (being guided by the inner ring), which causes complete spinning motion to occur on the orbit of the outer ring. However, when the rotation speed becomes high (and the load becomes small), effects of a centrifugal force become large, easily causing the cage to be guided by the outer ring.

In the present invention, attention is focused on the skidding due to spinning which significantly contributes to the wear and on the curvature radius of the orbit slot of the inner ring, and by lowering the PV value that is obtained by the skidding due to spinning (product of the bearing surface pressure "P" multiplied by the skidding speed "V"), the wear can be reduced. More specifically, by making the curvature radius of the orbit slot of the inner ring larger than the standard value so as to make the area of contact of the balls with the orbit slot small, the PV value is decreased.

Because the balls, the inner ring and the outer ring of the antifriction bearing for the supercritical $CO_2$ pump in accordance with the present invention are formed of a ceramic, wear resistance is enhanced; wherein, additionally, the curvature radius of the orbit slot of the inner ring is larger than 52% of the ball diameter, and especially, larger than 54%, the area of contact on the inner ring side becomes small. In the result, the PV value becomes small, which makes it possible to reduce the wear further. Consequently, reduction in endurance of the antifriction bearing is prevented, so that a supercritical $CO_2$ pump employing the antifriction bearings will not cause a problem that it cannot be used continuously because the vibration becomes high.

In addition, the upper limit of the curvature radius of the orbit slot of the inner ring is not specifically limited, but is no more than 60% of the ball diameter, considering the other performances. Also, the curvature radius of the orbit slot of the outer ring is not specifically limited, but is generally more than 50.5% and not greater than 60%.

Moreover, the cage holding the balls is guided by a rotating ring. Or, the cage holding the balls is guided by a fixed ring, wherein the guide surface is formed only on one side to the center of the balls in the axial direction.

In order to have the guide surface of a fixed ring formed only on one side in the axial direction, in case of being guided by the fixed ring, the inside diameter of the outer ring on one side in the axial direction may be made large so as not to have the inner peripheral surface of the large diameter part of the outer ring contact the outer peripheral surface of the cage; or the outside diameter of the cage on one side in the axial direction may be made small so as not to have the outer peripheral surface of the small diameter part of the cage contact the inner peripheral surface of the outer ring. In addition, in case of being guided by a rotating ring, the outside diameter of the inner ring on one side in the axial direction may be made small so as not to have the outer peripheral surface of the small diameter part of the inner ring contact the inner peripheral surface of the cage; or the inside diameter of the cage on one side in the axial direction may be made large so as not to have the inner peripheral surface of the large diameter part of the cage contact the outer peripheral surface of the inner ring.

In the antifriction bearing which is used in a fluid atmosphere, revolution of rolling elements (balls) [rotation of the cage] is delayed mainly by resistance of the fluid, especially in a high-speed rotation range, causing skidding (revolution skidding) to occur between the orbit ring and the rolling elements which must be in contact while rolling. When the revolution skidding occurs, the orbit ring and the rolling elements cannot sometimes be used continuously because they get damaged in a short time. In the present invention, an attention is focused on this revolution skidding, and by restraining the revolution skidding, antifriction bearings can be used continuously.

Specifically, by having the cage guided by a rotating ring, delay in revolution of the cage is decreased by a traction force due to contact with the rotating ring and a traction force of the fluid in the guide part (by driving the cage in the direction of revolution), thereby restraining the revolution skidding. And also, by having the cage guided by a fixed ring so as to have the guide surface formed only on one side to the center of the rolling elements in the axial direction, the resistance which is applied to the rolling cage by the fixed ring (friction due to contact and viscosity resistance of the fluid) is decreased, thereby restraining the revolution skidding.

Effects of Invention

In accordance with the present invention, a pump for carrying supercritical $CO_2$ fluid or liquid $CO_2$, capable of securing reliability by optimizing a bearing part can be supplied.

Specifically, by employing a totally ceramic bearing, it is possible to enhance the corrosion resistance against a cleaning agent. Additionally, it is possible to reduce a centrifugal force due to high-speed rotation, enhance wear resistance and prevent damages caused by particles coming from the outside.

Moreover, by reducing the drag loss of the cage, damages caused by the revolution skidding of a bearing can be prevented. Also, by enhancing the characteristic of the revolution skidding, the preload can be decreased, which reduces the thrust load, thereby achieving extension of operating life of the bearing. Additionally, by decreasing the drag loss, efficiency of the pump can be enhanced.

For the rest, by optimizing the ratio of the ball diameter versus the radius of the orbit slot (ratio of the slot radius), seize resistance can be improved and at the same time, extension of operation life can be achieved, thereby achieving optimization. Also, by applying a PEEK member to the material of the cage, corrosion resistance and strength of the cage can be enhanced.

Moreover, when a totally ceramic bearing is employed, there is a concern of a damage being caused by excessive stress of shrinkage of the inner ring of the bearing due to thermal expansion differential between the main shaft and the inner ring of the bearing that occurs when the temperature ascends. However, this can be avoided by having the main shaft formed to be a hollow shaft.

Also, by having the cage of an antifriction bearing guided by a rotating ring, a force driving in the direction of revolution from the fluid in the rotating ring and the guide part acts on the rolling elements, thereby restraining the revolution skidding. In consequence, endurance of the antifriction bearing can be prevented from deteriorating, so that such a problem will not occur as a pump for supercritical $CO_2$ employing this antifriction bearing cannot be used continuously because the vibration becomes higher.

Or, by having the cage guided by a fixed ring and having the guide surface formed only on one side to the center of the rolling elements in the axial direction, it is possible to reduce a force which disturbs movement of the rolling elements to the direction of revolution, thereby restraining the revolution skidding. In consequence, endurance of the antifriction bearing can be prevented from deteriorating, so that such a problem will not occur as a pump for supercritical $CO_2$ employing this antifriction bearing cannot be used continuously because the vibration becomes higher.

DESCRIPTION OF CODES

1: Circulation Pump
2: Discharge-Side/Suction-Side Casing
3: Purging-Side Casing
4: External Cylinder
5: Manifold
6: Canned Motor
7: Main Shaft
8 and 9: Angular Ball Bearing
10: Impeller
11: Preload Spring

BEST MODE FOR CARRYING OUT OF THE INVENTION

Figure 1:
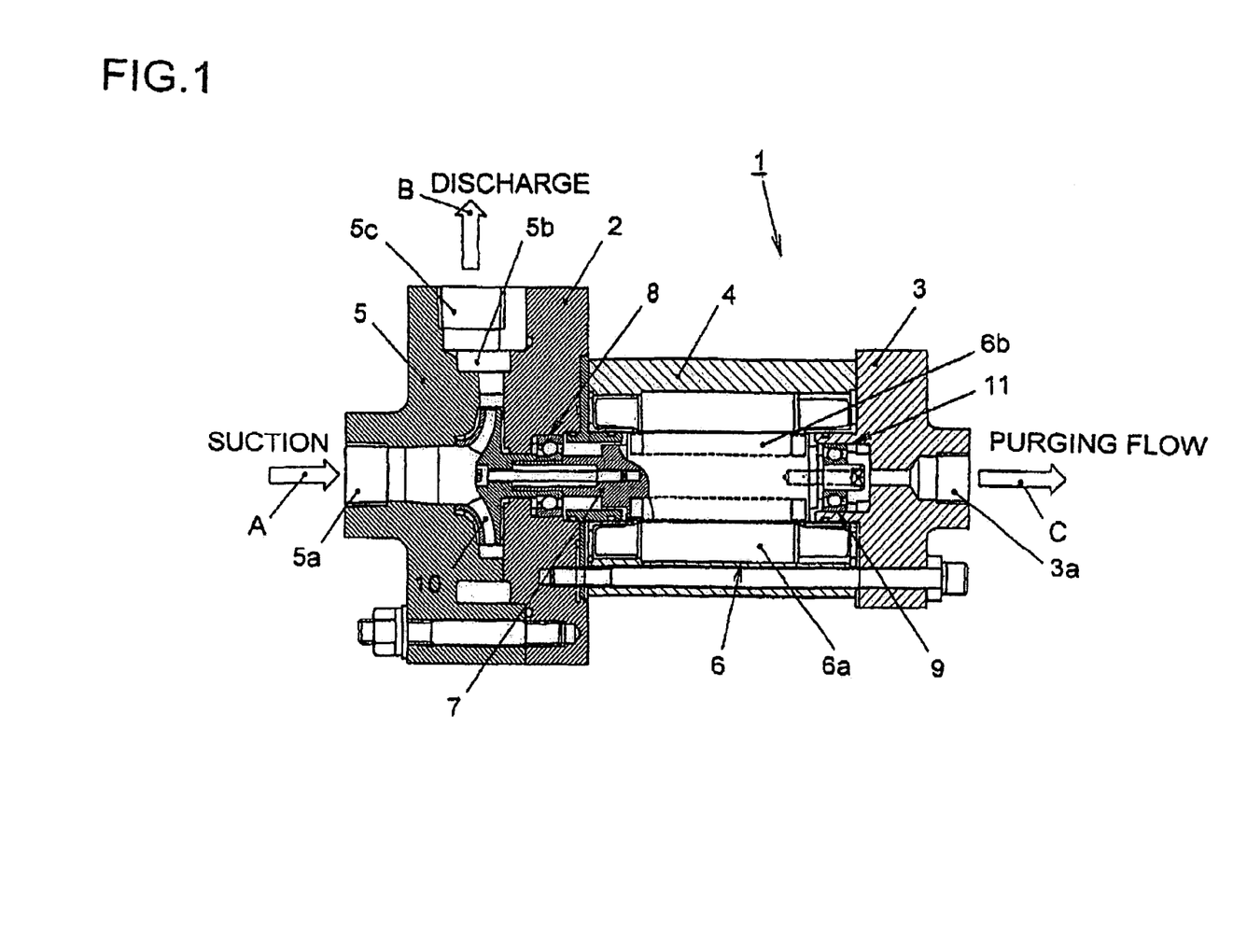
FIG. 1 is a cross-sectional view showing the construction of a $CO_2$ pump in accordance with an embodiment of the prevent invention.

Referring now to the drawings, an embodiment of the present invention will be described hereinafter. FIG. 1 is a cross-sectional view showing the construction of a $CO_2$ pump in accordance with an embodiment of the present invention. A pump 1 comprises a discharge/suction-side casing 2, a purging-side casing 3 and an outer cylinder 4 being held therebetween. Outside the suction/discharge-side casing 2 is installed a manifold 5 which sucks and discharges the liquid being pumped.

Inside the outer cylinder 4 is installed a canned motor 6 which drives the pump 1, comprising a stator 6a outside thereof and a rotor 6b being housed inside the stator 6a. The rotor 6b is installed to a main shaft 7; and the main shaft 7 is supported on both ends thereof by an angular ball bearing 8 being installed to the discharge/suction-side casing 2 and an angular ball bearing 9 being installed to the purging-side casing 3 so as to rotate, specifically, being axially supported.

Between the discharge/suction-side casing 2 and the manifold 5 is installed an impeller 10, which is mounted to one end of the main shaft 7 and can rotate, working simultaneously with the main shaft 7. The manifold 5 has a suction port 5a for the liquid being pumped opened on the extension shaft line from one end of the main shaft 7; and has a spiral casing 5b mounted around the impeller 10. Additionally, a discharge port 5c is opened from one point of the periphery part of a pathway 5b toward the outer peripheral surface of the manifold 5 in a radial direction.

On the other hand, the purging-side casing 3 has a purging port 3a opened on the extension shaft line form the other end of the main shaft 7, which discharges a part of sucked liquid being pumped. As for the rest, a preload spring 11 is held between the purging-side casing 3 and the angular ball bearing 9. The preload spring 11 is a corrugated plate spring in the shape of a ring being located in the vicinity of the other end of the main shaft 7 and provides an axial preload to the angular ball bearing 9, serving as a constant-pressure spring method. In addition, the angular ball bearing 8 is referred as an impeller-side bearing, while the angular ball bearing 9 is referred as a shaft-end-side bearing.

In the pump 1 as described hereinabove, when the rotor 6b of the canned motor 6 and the main shaft 7 rotate, causing the impeller 10 to rotate simultaneously, the liquid being pumped is sucked through the suction port 5a as shown with an arrow "A," introduced into the pathway 5b by the centrifugal force of the impeller 10 and is discharged through the discharge port 5c in the end as shown with an arrow "B." Additionally, a part of the liquid being pumped and sucked through the suction port 5a passes through the inside of the angular ball bearings 8 and 9 and the canned motor 6, cooling them, and is discharged through the purging port 3a as a purging flow as shown with an arrow "C."

Now, in the present invention, in order to enhance wear resistance and corrosion resistance and reduce the centrifugal load during high-speed rotation, ceramic materials (for example, silicon nitride $Si_3N_4$, alumina $Al_2O_3$, silicon carbide $SiO_2$ and the like) are employed for the inner and outer rings and the balls of the angular ball bearing. By having the bearing members totally formed of a ceramic, wear resistance against particles being brought from the outside is enhanced, and further, in application in which metal particles (particles of wear) are not permitted, favorable effects can be achieved on prevention against metal pollution.

Additionally, the cage is designed in a manner that the drag loss (rotational resistance) becomes smaller. By this, it is possible to prevent the revolution skidding and reduce the preload (the thrust bearing load), so that the service life of the bearings can be extended. In order to secure corrosion resistance and wear resistance against the cleaning agent and maintain the strength for high-speed rotation, a PEEK material (polyether ether ketone) is used for the material of the cage. As for this, by using the PEEK material containing 30% glass fiber, for example, the strength is increased further. In addition, the ratio of the ball diameter versus the radii of the orbit slots of the inner and outer rings is optimized in order to enhance wear resistance and detachment resistance in high-speed and high-load conditions. Moreover, by containing solid lubricants such as PTFE, carbon and the like, wear resistance of the ball bearings in supercritical $CO_2$ fluid or liquid $CO_2$ which has inferior lubricating property is enhanced.

Figure 2:
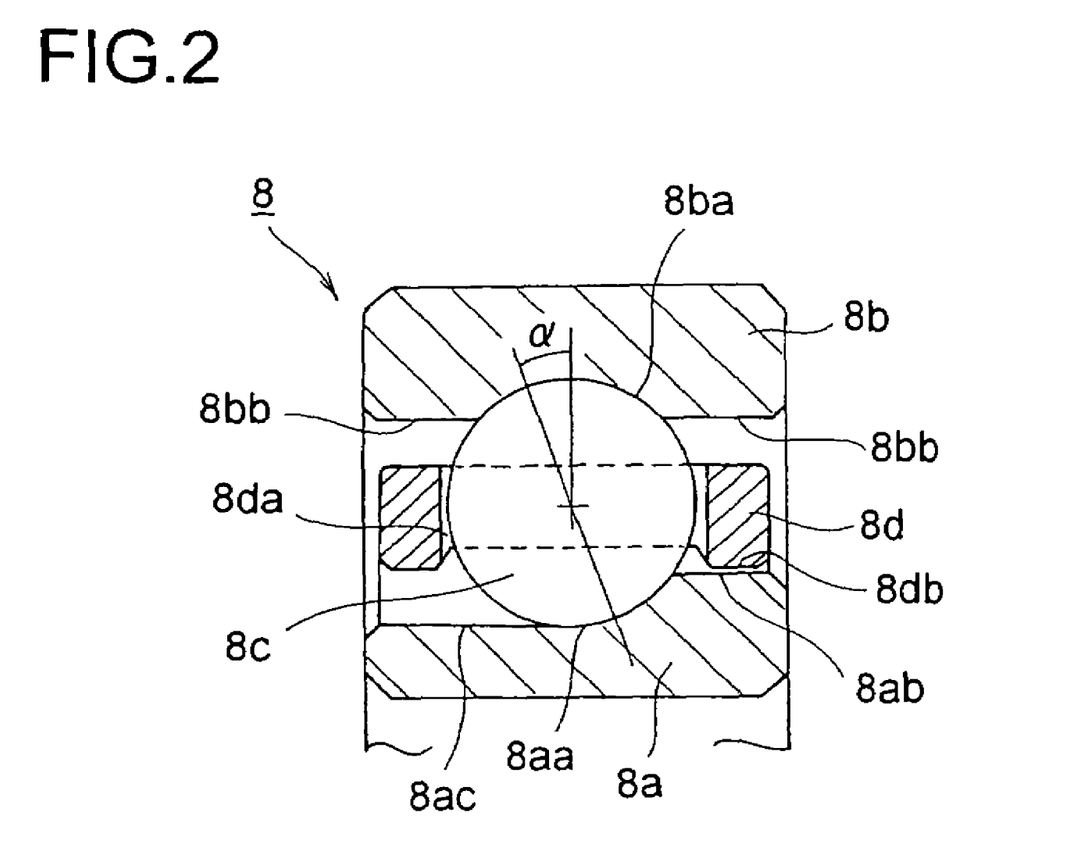
FIG. 2 is a schematic cross-sectional view showing a bearing in accordance with the embodiment.

FIG. 2 is a schematic cross-sectional view showing the bearing in accordance with the embodiment of the present invention. FIG. 2 shows a case of the angular ball bearing 8, but the angular ball bearing 9 is formed only in a manner that FIG. 2 is flipped horizontal, and basically, has the same construction. As shown in FIG. 2, the angular ball bearing 8 in accordance with the embodiment comprises an inner ring 8a, an outer ring 8b, balls 8c being held therebetween and a cage 8d holding the balls 8c.

The inner periphery of the outer ring 8b consists of an orbit slot 8ba where the ball 8c rolls and inner peripheral surfaces 8bb on both sides in the axial direction thereof. Also, the outer periphery of the inner ring 8a consists of an orbit slot 8aa where the ball 8c rolls, the outermost peripheral surface 8ab on one side in the axial direction and the outer peripheral surface 8ac on the other side which continues form the orbit slot 8aa. Additionally, the cage 8d is a ring-shaped member being installed between the inner ring 8a and the outer ring 8b, and at the predetermined locations over the whole periphery thereof are provided pockets 8da having the ball 8c caught therein, being equiangularly spaced. In addition, "α" in the figure is a contact angle.

The ball bearing of a conventional $CO_2$ pump is totally formed of stainless steel, or has only the balls formed of a ceramic but has the inner and outer rings formed of stainless steel. However, as described hereinabove, the bearing in accordance with the embodiment is a totally ceramic hearing, wherein the balls and the inner and outer rings are formed of a ceramic. In addition, the cage of the conventional bearing is guided by both sides of the outer ring, being guided by the inner peripheral surfaces on both sides in the axial direction of the outer ring. However, the cage of the bearing in accordance with the embodiment is guided by the inner ring, and more precisely, is guided by one side of the inner ring, being guided by the outer peripheral surface on one side in the axial direction of the inner ring.

Specifically, in FIG. 2, the inner peripheral surface 8db of the cage 8d facing opposed to the outermost peripheral surface 8ab of the inner ring 8a is guided by the outermost peripheral surface 8ab of the inner ring 8a. This will enable the cage 8d to rotate easily in accordance with rotation of the inner ring 8a, thereby decreasing the rotational resistance (the drag loss) of the cage 8d, which can achieve prevention of the revolution skidding of the bearing. Moreover, such means is possible to reduce the drag loss as employing a totally ceramic bearing having no cage.

Additionally, seize resistance and extension of operating life of a ball bearing are contradictory. Therefore, the ball bearing in accordance with the embodiment is designed in order to achieve both seize resistance and extension of operating life by adjusting the ratio of the ball diameter versus the radii of the orbit slots of the inner and outer rings (the ratio of the slot radius). The range of the ratio of the slot radius is more than "the slot radius/the ball diameter×100=52%." Furthermore, it is desirable that the range of the ratio of the slot radius is within the range from 52 to 56% or is larger than 54%, especially.

Figure 3:
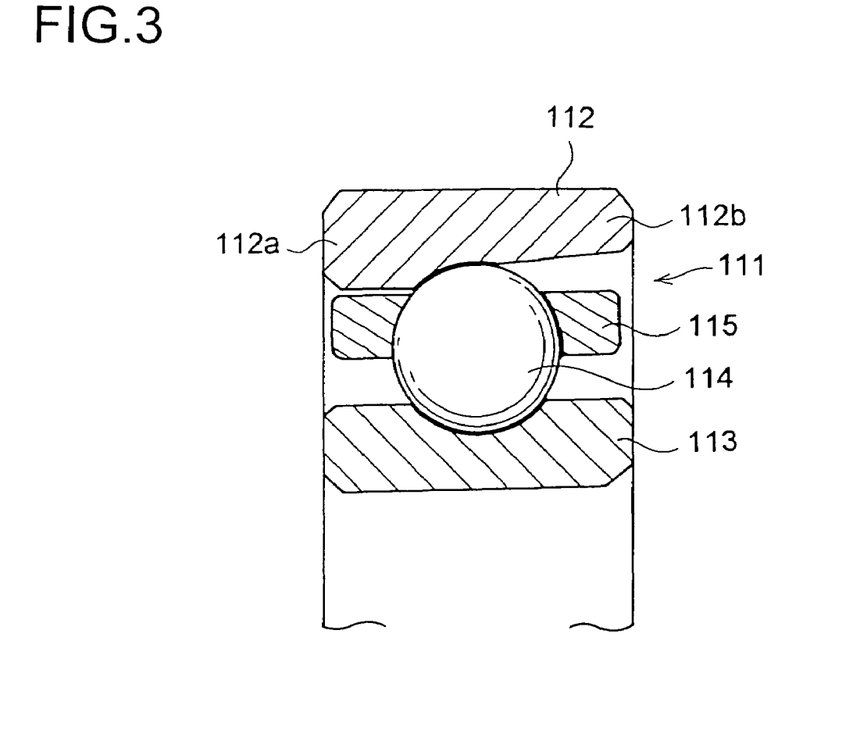
FIG. 3 is a longitudinal cross-sectional view showing an antifriction bearing in accordance with the embodiment.

The bearing in accordance with the embodiment of the present invention will be descried in details. The bearing in the accordance with the embodiment is an angular ball bearing as shown in FIG. 3, comprising an outer ring 112, an inner ring 113, balls 114 installed therebetween, serving as a plurality of rolling elements, and a cage 115 holding the balls 114. The outer ring 112, the inner ring 113 and the balls 114 are all formed of silicone nitride and the cage 115 is formed of PEEK, a super engineering plastic.

The cage 115 is formed in a manner that the outside diameter thereof is slightly smaller than the inside diameter of the outer ring 112 (for approximately 0.15 mm) in order to rotate smoothly, being guided by the outer ring 112 serving as a fixed ring. Then, the outer ring 112 comprises a small diameter part 112a which is the left half thereof, having the slightly larger inside diameter than the outside diameter of the cage 115 (for approximately 0.15 mm); and a large diameter part 112b which is the right half thereof, having the sufficiently larger inside diameter than the outside diameter of the cage 115; wherein the orbit slot of the outer ring 112 is formed so as to cover both the small diameter part 112a and the large diameter part 112b.

By this, the guide surface guiding the cage 115 is formed only on one side of the outer ring 112 in the axial direction (on the left side to the center of the balls). In addition, the "sufficiently large inside diameter" mentioned above means that when the outside ring 112 and the cage 115 rotate relatively, the distance between the facing surfaces of the outside ring 112 and the cage 115 in the left half is large enough to have almost no traction act between the facing surfaces.

Figure 4:
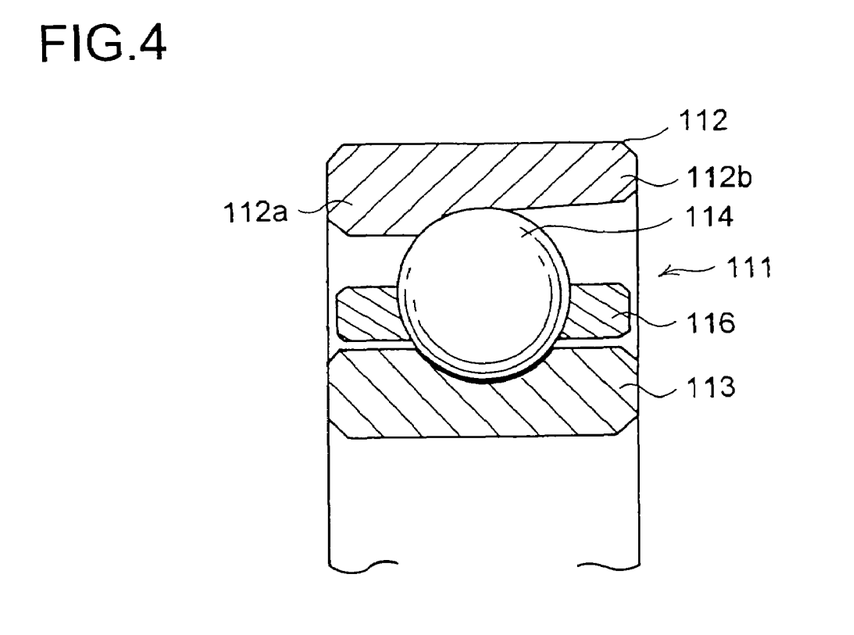
FIG. 4 is a longitudinal cross-sectional view showing an antifriction bearing in accordance with the embodiment.

The antifriction bearing 111 shown in FIG. 4 is different from the antifriction shown in FIG. 3 only in the cage. The cage 116 has the inside diameter thereof increased to be slightly larger than the outside diameter of the inner ring 113 in order to rotate smoothly, being guided by the inner ring 113 serving as a rotating ring.

Figure 5:
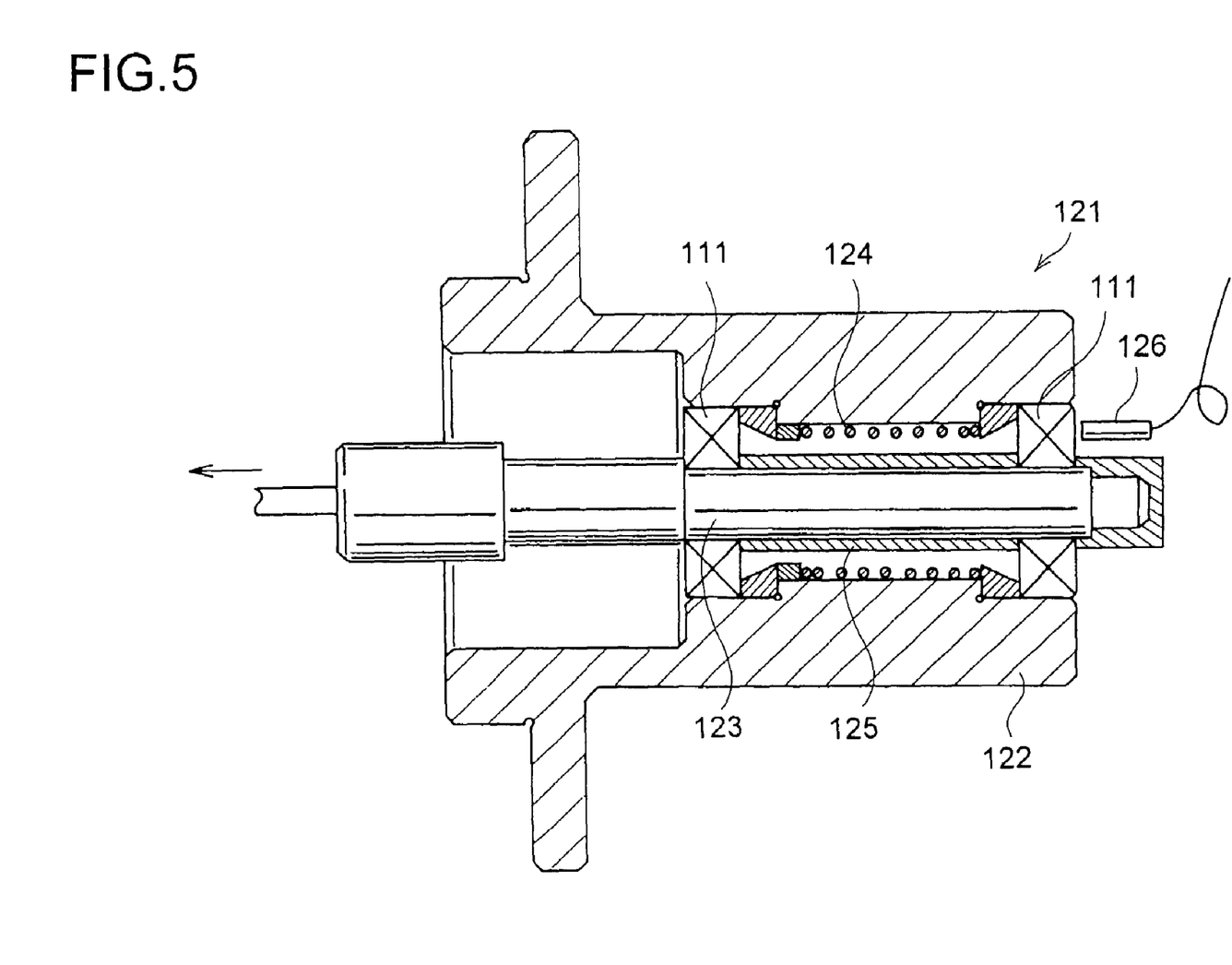
FIG. 5 is a longitudinal cross-sectional view showing an evaluation equipment of the antifriction bearing in accordance with the embodiment.

FIG. 5 shows an evaluation equipment of the above-mentioned antifriction bearing 111. The evaluation equipment 121 evaluates the revolution skidding of the antifriction bearing 111, comprising a cylindrical housing 122 and a rotating shaft 123 being housed so as to rotate relatively thereto, wherein the antifriction bearings 111 and 111 on both right and left sides which support the rotating shaft 123, rotating, are installed at two locations being axially separated between the housing 122 and the rotating shaft 123.

The rotating shaft 123 has the left end part thereof connected to the driving part (not illustrated) of an air turbine. On the outer ring side between the two antifriction bearings 111 exists a cylindrical coil spring 124 which loads the axial load thereto, while a cylindrical spacer 125 exists on the inner ring side. Then, a non-contact displacement gauge 126 is installed so as to face the right end surface of the antifriction bearing 111 on the right side.

The predetermined parts in the circumferential direction of the right-side surface of the cage 115 of the antifriction bearing 111 on the right side is coated with aluminum, thereby enabling the displacement gauge 115 to detect the frequencies of the aluminum coating part of the cage 115, so that the rotation speed of the cage 115, namely, the revolution speed of the balls 114, can be obtained from the frequencies.

By employing the above-mentioned evaluation equipment 121, the revolution speed "$n_C$" of the balls 114 of the antifriction bearing 111 is measured; and by obtaining the "ratio of the revolution skidding (%)=$(n_T-n_C)/n_T \times 100$" from the measured revolution speed "$n_C$" and the revolution speed "$n_T$" obtained theoretically, the revolution skidding of antifriction bearings of different specification can be evaluated; wherein, "$n_T$" can be obtained by "$n_T$=the rotation speed of the inner ring×(1−the ball diameter×cos α/the pitch diameter of the ball)/2," where "α" is a contact angle. The ratios of the revolution skidding obtained in the above-mentioned manner are shown in FIG. 6 and FIG. 7.

Figure 6:
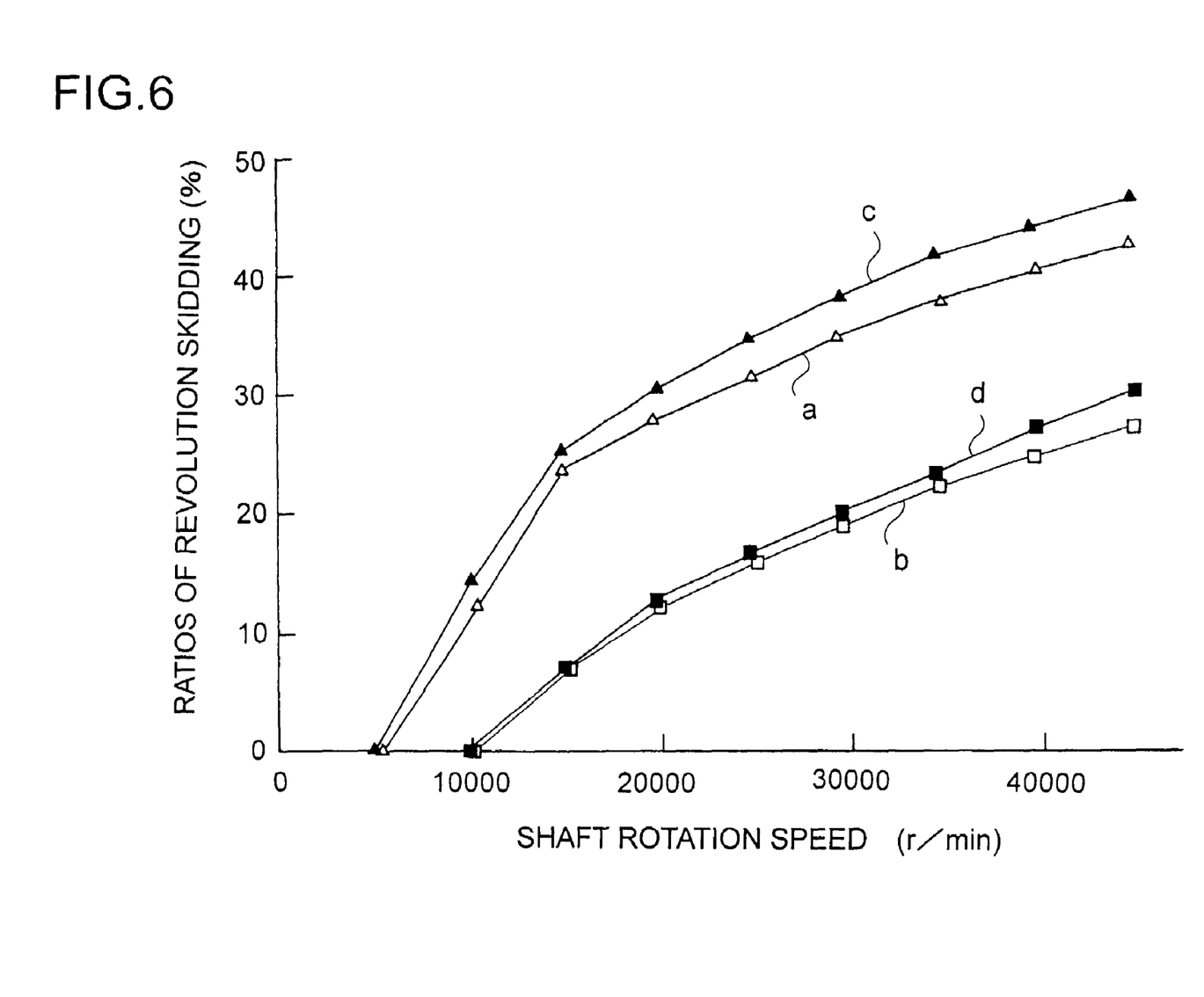
FIG. 6 is a graph showing the results of evaluation of the antifriction bearing.

In the graph in FIG. 6, the white triangles (and the broken line "a") show the ratios of the revolution skidding of the antifriction bearing 111 being guided by one side of the outer ring (FIG. 3) when the axial load is 6.5 kgf; the white squares (and the broken line "b") show the ratios of the revolution skidding of the same bearing 111 when the axial load is 23 kgf; the black triangles (and the broken line "c") show the ratios of the revolution skidding of the antifriction bearing being guided by both sides of the outer ring when the axial load is 6.5 kgf (a comparative example); and the black squares (and the broken line "d") show the ratios of the revolution skidding of the same bearing when the axial load is 23 kgf. As can be seen from the graph, in the antifriction bearing 111 shown in FIG. 3, the ratios of the revolution skidding becomes small, compared with the antifriction bearing having the guide surface formed on both sides in the axial direction, and the revolution skidding that deteriorates the wear performance of the antifriction bearing 111 is improved.

Figure 7:
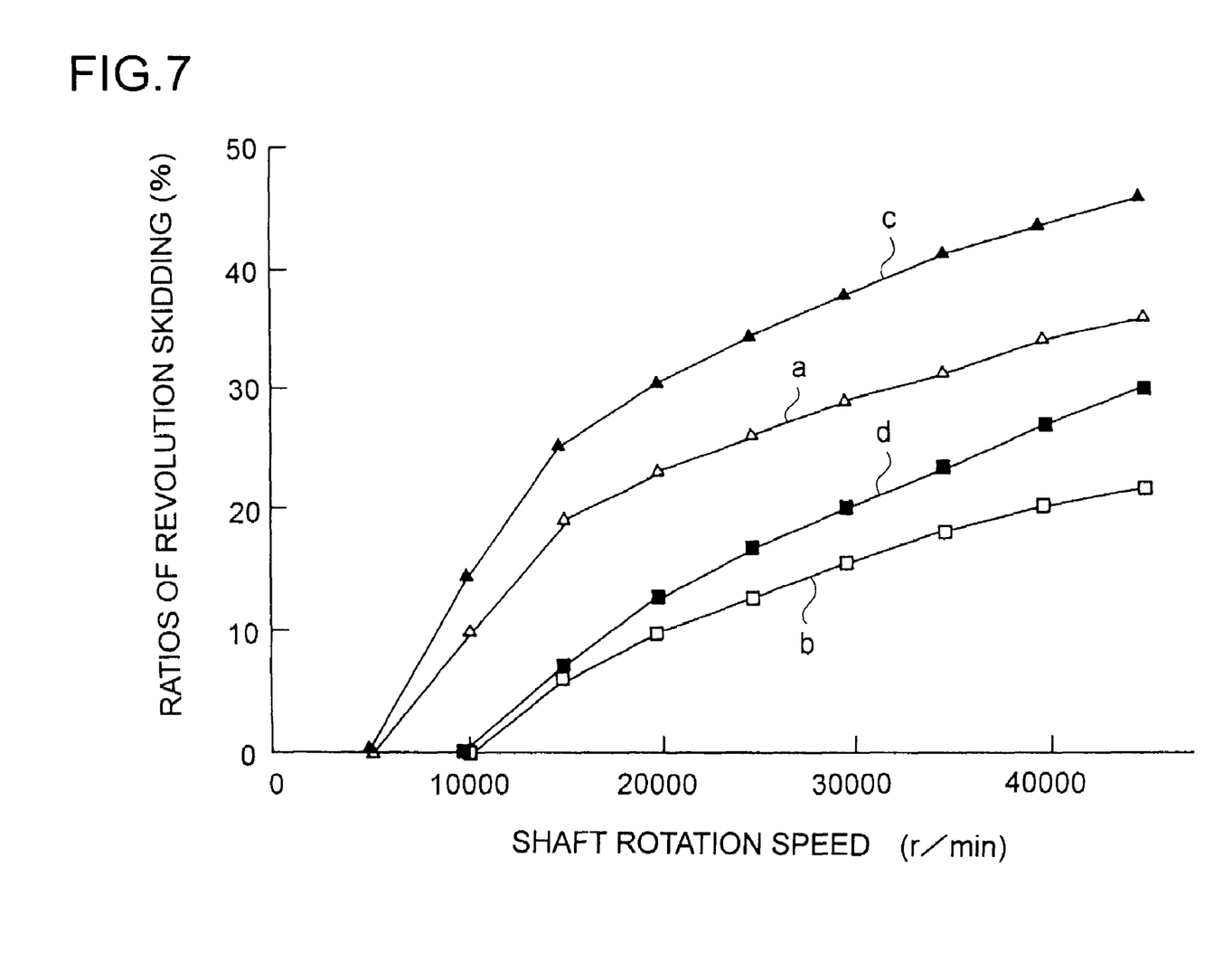
FIG. 7 is a graph showing the results of evaluation of the antifriction bearing.

In the graph in FIG. 7, the white triangles (and the broken line "a") show the ratios of the revolution skidding of the antifriction bearing 111 being guided by one side of the inner ring (FIG. 4) when the axial load is 6.5 kgf; the white squares (and the broken line "b") show the ratios of the revolution skidding of the same bearing 111 when the axial load is 23 kgf; the black triangles (and the broken line "c") show the ratios of the revolution skidding of the antifriction bearing being guided by both sides of the outer ring when the axial load is 6.5 kgf (a comparative example); and the black squares (and the broken line "d") show the ratios of the revolution skidding of the same bearing when the axial load is 23 kgf. As can be seen from the graph, in the antifriction bearing 111 shown in FIG. 4, the ratios of the revolution skidding becomes significantly small, compared with the antifriction bearing being guided by the outer ring and having the guide surface formed on both sides in the axial direction, and the revolution skidding that deteriorates the wear performance of the antifriction bearing 111 is remarkably improved.

FIG. 6 and FIG. 7 show the results of tests employing water. In the atmosphere of supercritical $CO_2$, gravity and viscosity become small, compared with water, so that effects can surely be expected. Therefore, in accordance with the bearings 111 shown in FIG. 3 and FIG. 4, endurance thereof is prevented from deteriorating, thereby making it possible to operate the supercritical $CO_2$ pump employing the antifriction bearings as described continuously for a long time although the bearings are subject to be a severe condition of being in the supercritical $CO_2$ atmosphere.

The results of analysis of the properties of the ball bearing in accordance with the embodiment will be descried hereinafter. Herein, effects of making the curvature radius of the orbit slot of the inner ring 113 larger than 54% of the ball diameter will be described by giving the results of calculation with an angular bearing having the inside diameter of Φ10 as a concrete example.

To put it simply, when the curvature radius of the orbit slot of the inner ring is changed from 52% to 56% of the ball diameter, the PV value will decrease from 747 (MPa·m/s) to 553 (MPa·m/s) where the axial load is 50N, and the PV value will decrease from 935 (MPa·m/s) to 708 (MPa·m/s) where the axial load is 100N and will decrease to be approximately ¾ on an average. The PV value can be lowered in this way, thereby reducing the wear.

The above-mentioned effect can be achieved by making the area of contact on the side of the inner ring 113 small so as to lower the PV value in a case where the skidding occurs on the side of the inner ring 113. By analyzing in more details from this point of view, in order to lower the PV value effectively, it is desirable to make the curvature radius of the orbit slot of the inner ring larger than 54% of the ball diameter. The upper limit of the curvature radius of the orbit slot of the inner ring is determined to be approximately as much as 60% of the ball diameter, considering the relation with the other performances. The curvature radius of the orbit slot of the outer ring is not limited specifically, but may be more than 50.5% and no greater than 60%.

In now, the supercritical $CO_2$ is generally used in the range from 35° C. to 100° C. On the other hand, there is a difference in the linear expansion coefficient between the main shaft member of the motor and the inner ring of the bearing supporting the shaft member. To put it simply, because austenite stainless steel is generally applied to the main shaft member, considering corrosion resistance, the linear expansion coefficient of the main shaft member is large, while the linear expansion coefficient of the inner ring of the bearing is small because the inner ring of the bearing is formed of a ceramic as described hereinabove.

Figure 8:
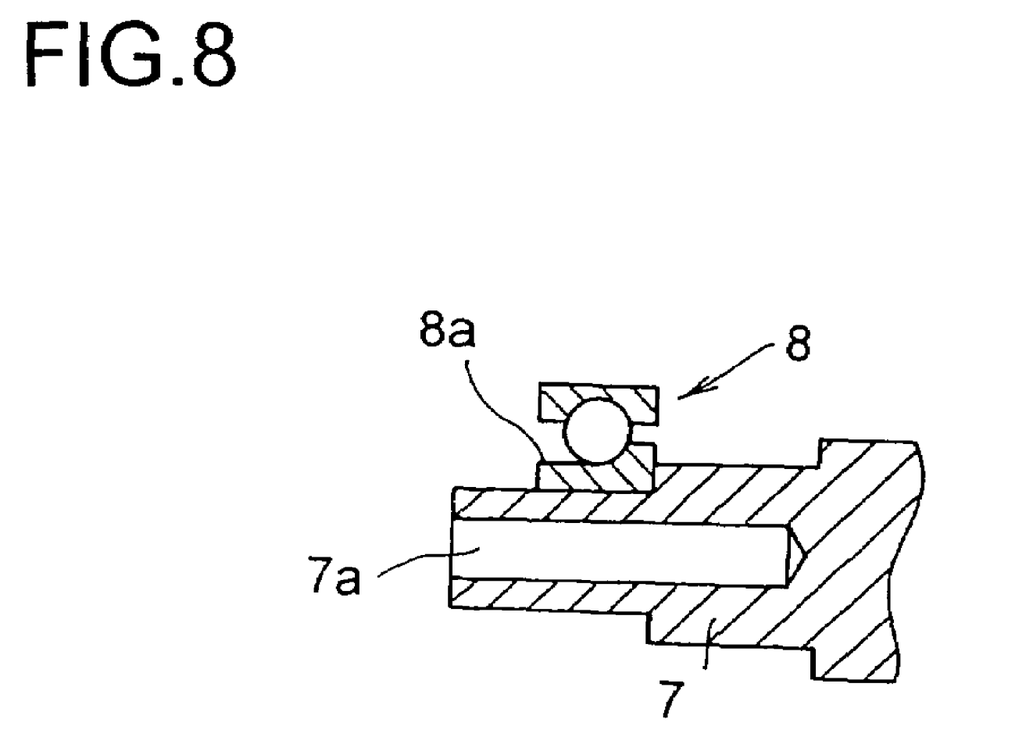
FIG. 8 is a schematic cross-sectional view showing the condition of the main shaft which is hollow.

Therefore, there is a concern that the inner ring of the bearing may be damaged due to expansion of the main shaft when the temperature ascends. Consequently, as shown in FIG. 8, by providing a bored hole 7a to the center of the axis of the main shaft 7 serving as a hole for a mounting bolt of the impeller and making the main shaft 7 hollow, expansion of the main shaft 7 is let to go inward, thereby mitigating the stress which is generated in the inner ring 8a of the angular ball bearing 8. Here, FIG. 8 shows the construction of the impeller side, and the construction of the shaft end side is the same although there are no bolts.

The bearing in accordance with the present invention employs balls for rolling elements thereof, so as to be a ball bearing, but not limited to. The bearing may be a roller bearing that employs a cylindrical roller or a roller in the form of a circular truncated cone.

It is to be understood that the present invention may be carried out in any other manner than specifically described above as an embodiment, and many modifications and variations are possible within the scope of the invention.

What is claimed is:

1. A pump carrying supercritical $CO_2$ fluid or liquid $CO_2$, comprising:
   a canned motor which rotary drives an impeller mounted on one end of a main shaft of the canned motor working simultaneously with the main shaft; and
   bearings which support the main shaft of the canned motor, wherein
   the pump carries the supercritical $CO_2$ fluid or the liquid $CO_2$ by rotary driving of the impeller,
   each of the bearings is a ball bearing of which an inner ring, an outer ring and balls are made of ceramic material, and
   the main shaft is hollow so that a deformation of the main shaft expands inward.

2. The pump according to claim 1, further comprising:
   a manifold having a suction port through which the supercritical $CO_2$ fluid or the liquid $CO_2$ is suctioned and a discharge port through which the supercritical $CO_2$ fluid or the liquid $CO_2$ is discharged,
   a discharge/suction-side casing which forms a space with the manifold, the space is a part of a passage connecting the suction port with the discharge port,
   a purging-side casing having a purging port through which some of the supercritical $CO_2$ fluid or the liquid $CO_2$ is discharged, and
   an outer cylinder being held between the discharge/suction-side casing and the purging-side casing and inside of which the canned motor is installed, wherein
   one of the bearings is an angular ball bearing installed on the discharge/suction-side casing and another of the bearings is an angular ball bearing installed on the purging-side casing, and
   the canned motor has a stator and a rotor installed on the main shaft, and both ends of the main shaft are rotatably supported by the angular ball bearings.

3. The pump according to claim 2, wherein
   the bearings are used while immersed in the liquid which is the supercritical $CO_2$ fluid or the liquid $CO_2$.

4. The pump according to claim 2, wherein the main shaft is made of austenite stainless steel.

5. The pump according to claim 2, wherein
   the pump is used as a circulation pump for washing semiconductors.

6. The pump according to claim 2, wherein
   a hollow portion of the main shaft is formed by providing a bored hole in the main shaft, and
   a bolt for mounting the impeller on the main shaft is fastened into the bored hole.

7. The pump according to claim 6, further comprising:
   a preload spring which is installed between the purging-side easing and the bearing installed to the purging-side casing and which provides a preload to the bearing.

8. The pump according to claim 7, wherein
   the bearings are used while immersed in the liquid which is the supercritical $CO_2$ fluid or the liquid $CO_2$.

9. The pump according to claim 7, wherein the main shaft is made of austenite stainless steel.

10. The pump according to claim 7, wherein the pump is used as a circulation pump for washing semi-conductors.

11. The pump according to claim 6, wherein
the bearings are used while immersed in the liquid which is the supercritical $CO_2$ fluid or the liquid $CO_2$.

12. The pump according to claim 6, wherein the main shaft is made of austenite stainless steel.

13. The pump according to claim 6, wherein
the pump is used as a circulation pump for washing semi-conductors.

14. The pump according to claim 2, further comprising:
a preload spring which is installed between the purging-side casing and the bearing installed to the purging-side casing and which provides a preload to the bearing.

15. The pump according to claim 14, wherein
the bearings are used while immersed in the liquid which is the supercritical $CO_2$ fluid or the liquid $CO_2$.

16. The pump according to claim 14, wherein the main shaft is made of austenite stainless steel.

17. The pump according to claim 14, wherein the pump is used
as a circulation pump for washing semi-conductors.

18. The pump according to claim 1, wherein
the bearings are used while immersed in the liquid which is the supercritical $CO_2$ fluid or the liquid $CO_2$.

19. The pump according to claim 1, wherein the main shaft is made of austenite stainless steel.

20. The pump according to claim 1, wherein
the pump is used as a circulation pump for washing semi-conductors.

* * * * *